No. 833,959. PATENTED OCT. 23, 1906.
R. J. ELLIS.
HORSE DETACHING DEVICE.
APPLICATION FILED DEC. 26, 1905.
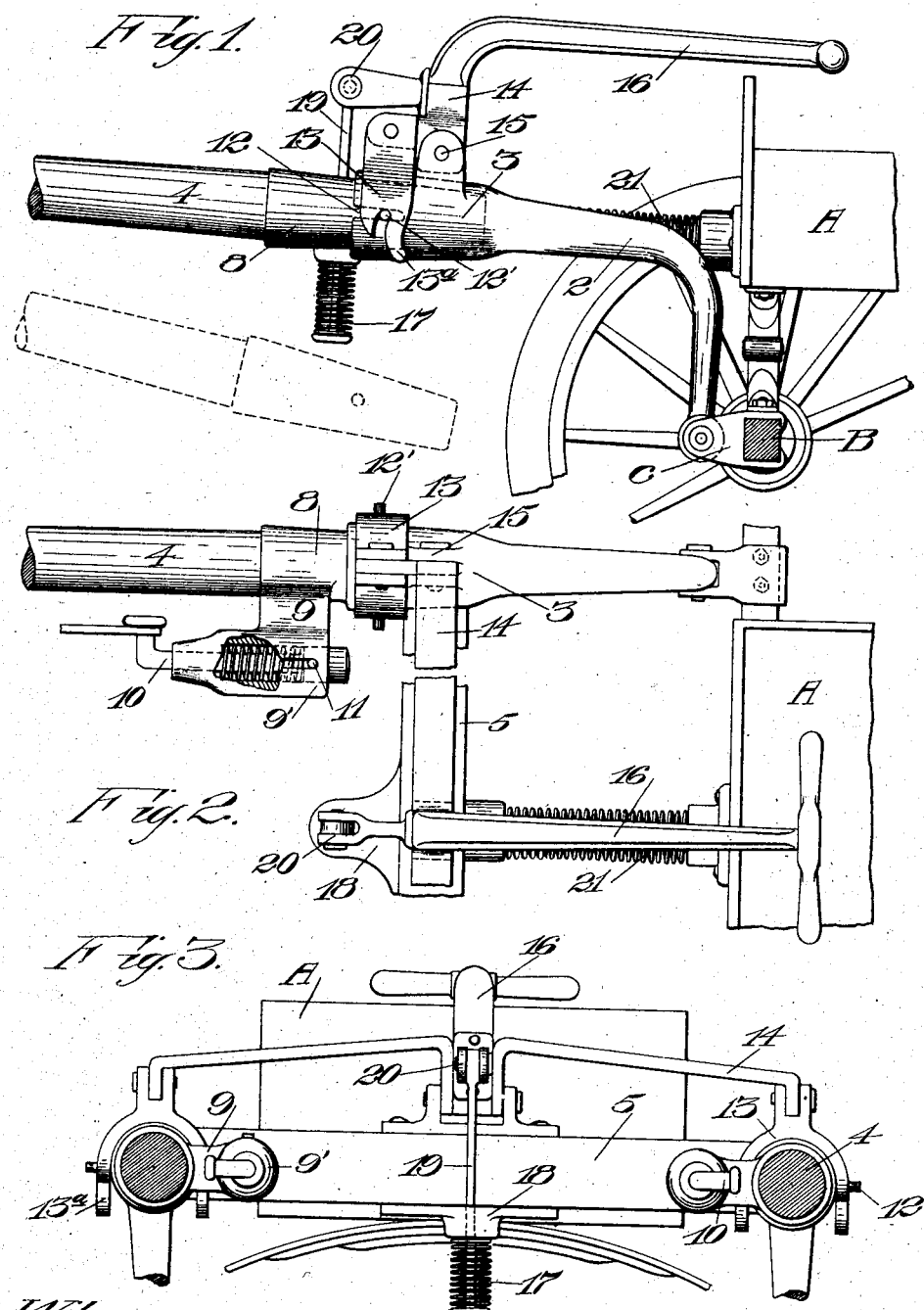
Witnesses. Inventor.
Robert J. Ellis
By Geo. H. Strong
Atty.

UNITED STATES PATENT OFFICE.

ROBERT J. ELLIS, OF SAN FRANCISCO, CALIFORNIA, ASSIGNOR OF ONE-HALF TO J. M. DIVEN, OF SAN FRANCISCO, CALIFORNIA.

HORSE-DETACHING DEVICE.

No. 833,959.      Specification of Letters Patent.      Patented Oct. 23, 1906.

Application filed December 26, 1905. Serial No. 293,244.

*To all whom it may concern:*

Be it known that I, ROBERT J. ELLIS, a citizen of the United States, residing in the city and county of San Francisco and State of California, have invented new and useful Improvements in Horse-Detaching Devices, of which the following is a specification.

My invention relates to a means for detaching unmanageable horses from vehicles and means for controlling the vehicle after detaching until it can be stopped.

It consists in the combination of mechanism and details of construction, which will be more fully explained by reference to the accompanying drawings, in which—

Figure 1 is a broken-away side elevation of my horse-detaching device. Fig. 2 is a plan view showing one side of the shafting broken away. Fig. 3 is a front view, partially broken away.

When a team becomes unmanageable, it is desirable to disengage the team or horse and allow him to go free for the safety of the vehicle and its occupants, and it is also necessary to afterward control the movement of the vehicle until it can be brought to a state of rest.

It is the object of my invention to provide such a mechanism and a means for yieldingly connecting the animal or team with the draft connections of the vehicle.

It will be understood that the apparatus may be equally well applied to the connections for a single animal as for a plurality of animals, slight changes in the mechanism being within the province of any one capable of driving.

In the present illustration I have shown connections for a single horse.

A represents the vehicle mounted upon wheels, as shown, and the front axle B is shown with clips C, to which the shaft or other connecting-irons 2 are attached.

The front ends of the shaft-irons 2 are made tubular and preferably slightly conical from the outer toward the inner end of the socket 3, so that the rear ends of the shafts 4 will fit snugly into these tubular sockets and will make a stiff connection when so fitted. Behind or contiguous to these sockets is the cross-bar 5, which is rigidly fixed so as to connect the shaft-irons and sockets and cause them to move about the hinge-points in unison. The shafts have fixed upon their rear ends metal cones 8, which are adapted to fit into the sockets 3, and thus make a metal connection. These cones have arms 9 extending inwardly, and these arms carry at their inner ends the tubular sockets 9'. Within these sockets are slidable rods 10, having guiding-pins 11 projecting through slots in the tubular sockets to prevent the pins from turning. The outer ends of these pins are bent to form attachment for the traces which connect the harness and horse with the vehicle. Within these tubes or sockets are sufficiently stiff springs pressing against collars or equivalent parts of the slidable pins 10 and normally pressing them toward the rear ends of the sockets, and thus drawing the trace attachments backwardly. When any pull of the draft-animal takes place, these springs yield and tend to prevent chafing and sudden strains upon the animal. These parts and the sockets 8 and the shafts being all connected, any release of strain upon the traces will allow the springs to pull the trace attachments back with relation to the sockets, and will thus maintain sufficient tension on the traces to prevent their being detached if the horse and shafts were released from the vehicle.

The releasing device is constructed as follows: The sockets 3 have slots made in them transversely, as shown at 12, and the cones 8, which fit the sockets, have pins projecting to enter the slots when the two are united. This prevents the shafts from turning and maintains the trace connections in the proper line. 13 represents latches which are adapted to hook over the pins 12, and thus lock the rear ends of the shafts to the sockets 3. These latches in the present construction are shown as connected with bars 14, the outer ends of which carry the latches and are pivoted or fulcrumed upon the sockets 3, as shown at 15, so that by tilting the arms 14 about their fulcrum-points at each end of the bar 5 it will be seen that the latches may be either engaged to retain the shafts in place or disengaged to allow them to be pulled out of the sockets 3.

The movement of the arms 14 is controlled as follows: 16 is a bent lever fulcrumed upon the top of the cross-bar 5, and to this lever the inner ends of the arms 14 are secured, so that they are tilted simultaneously by the movement of this lever. The lever is normally held in position by a spring 17, supported by a bracket 18, through which passes a rod 19, the upper end of which is connected with a lug or bracket 20 upon the lever 16, and the lower end extending through the bracket 18 has upon its lower end an enlargement or head, between which and the bracket 18 the spring acts and by its expansion pulls the lever and the arms 14 downwardly, so that the latches 13 will be maintained in secure engagement with the pins 12.

In order to disengage the shafts and the connected team, it is only necessary to press down upon the handle of the lever 16, which extends to within convenient reach of the driver, and this will by turning the arms 14 raise and disengage the latches 13, thus allowing the horse to pull the shafts away from the vehicle. The rear ends of the shafts will fall upon the ground and not having any cross-bar connected with this portion will not be liable to injure the animal's feet if he continues running. At the same time the metal cones or ends of the shafts dragging upon the ground will prevent damage to the wooden portion. The connecting-irons 2 and the cross-bar 5 are prevented from dropping down by a spring 21, one end of which is attached to the front of the vehicle and the other to the cross-bar 5. The tension of this portion of the spring is sufficient to hold the front ends of the sockets 3 in substantially their normal position, and the handle by reason of its extending rearwardly serves as a steering-bar by which the driver can control the vehicle and prevent its turning suddenly to one side or being upset.

Any usual or well-known foot-brake will serve to assist in bringing the vehicle to a state of rest, and the steering device will keep it in the road and prevent accident.

It should be noted that the rear lower ends of the latches are extended, as at 13ª, and when the latches are lifted to disengage the pins 12' of the shafts the extensions 13ª press against the pins and act to force them and the shaft ends out of the sockets 3, thus insuring a positive disengagement if the parts should adhere.

Having thus described my invention, what I claim, and desire to secure by Letters Patent, is—

1. The combination with a vehicle, of a shaft-iron having a tubular socket in its forward end, a shaft or pole having a rear end conforming to and slidably fitting said socket, a latching device whereby the shaft and shaft-iron are normally united, and means whereby the latching device is operated to release the shaft.

2. The combination with a vehicle, of a shaft-iron having its forward end provided with a conical socket, a shaft having a conical rear end to enter said socket, said socket having a slot and said shaft having a pin engaging said slot and projecting to the outside of the socket, a latch adapted to engage said pin to lock the shaft in the socket, and a lever and connections for operating the latch to release the shaft.

3. The combination with a shaft-iron having a tubular socket in its forward end, of a shaft having a metal-shod rear end slidably fitting the socket, a latching means for locking the shaft in the socket, and means for operating the latch to release the shaft.

4. The combination with a vehicle of draft attachments therefor, said draft attachments comprising the shaft or pole connections with the axle, tubular sockets fitted to the front end, shafts having cylindrical metal shoes fixed to the rear ends and telescopically fitting said sockets, interlocking pins and latches whereby the parts are normally locked together, a fulcrumed lever and arms connecting said lever with the latches whereby disengagement may be effected.

5. In a vehicle and draft attachment, connections with the vehicle having sockets at the front, metal parts carried by the shafts and poles and fitting said sockets, said attachments having inwardly-extending arms and tubes supported thereby, spring-pressed rods slidable within the tubes and having at their outer ends trace attachments as herein described.

6. In a device for detaching horses from vehicles, sockets connected with the vehicles, cones upon the rear end of the shafts fitting the sockets, and means for detachably connecting the cones and sockets, tubes carried by said cones having slidable rods movable therein, said rods carrying trace attachments, and springs by which the rods are forced back within the tubes to maintain tension upon the traces when the animals are disengaged.

7. In a disconnecting attachment for vehicles, the shaft-irons hinged to the vehicle having the rigid transverse bar uniting the forward ends, and sockets with which the shafts are detachably connected, and a spring by which the shaft-irons and sockets are maintained in position after the shafts have been disengaged therefrom.

8. In a vehicle, shaft-irons having a rigid connecting cross-bar and sockets at the front, connections between the rear ends of the shafts and said sockets, latches by which the parts are normally locked together, a lever fulcrumed to the cross-bar and extending backwardly to the vehicle, said lever serving to disconnect the shafts from their connections and also to steer the vehicle when the animal is freed therefrom, and a spring by which the shaft-irons are independently supported in their normal position.

9. The combination with a vehicle and means for attaching draft-animals thereto of sockets connected with the vehicle, metal shaft ends fitting the sockets and carrying interlocking pins, fulcrumed latches engaging the pins, lever connections to tilt and disengage the latches, said latches having rear extensions which engage and forcibly eject the pins.

In testimony whereof I have hereunto set my hand in presence of two subscribing witnesses.

ROBERT J. ELLIS.

Witnesses:
J. M. DIVEN,
GEO. T. KNOX.